Patented Dec. 3, 1940

2,223,753

UNITED STATES PATENT OFFICE 2,223,753

ART OF PRODUCING FERMENTED MALT BEVERAGES

James S. Wallerstein, New York, N. Y., assignor to Wallerstein Company, Inc., New York, N. Y., a corporation of New York No Drawing. Application August 27, 1938, Serial No. 227,105. Renewed May 11, 1940

4 Claims. (Cl. 99—48)

This invention relates to the art of producing fermented malt beverages.

For convenience, the invention is herein described in connection with beer but it is to be understood that the description is equally applicable to ales and other fermented malt beverages.

For many years, it has been known to the brewing industry that beer tends to become cloudy or turbid when cold, e. g., when subjected to refrigerating temperatures. This is particularly so in the case of packaged beers which are pasteurized. It has been proposed to "chill-proof" beers, i. e., render them more stable to cold, by the addition of proteolytic enzymes such as malt enzymes, pepsin, papain and bromelin. See, for example, U. S. Patents to Leo Wallerstein Nos. 995,820, 995,824, 995,825, 995,826, 2,077,447, 2,077,448 and 2,077,449. These proteolytic enzymes have been used by brewers generally for chill-proofing beer for many years. Presumably such enzymes so modify the proteins in the beer which would cloud the beer when chilled, as to prevent or reduce such tendency to cloudiness.

I have found, however, that there are causes of cloudiness, turbidity and color change in beer that are not altogether obviated by the use of proteolytic enzymes. It is known that beer contains tannin, introduced from the malt and hops and which is only partly eliminated during fermentation and clarification. It is my belief that in the fermented beer, the tannin combines with proteins present to form tannin-protein complexes and that these complexes are unstable under the influence of cold, settling out of solution and forming a cloudy or turbid condition.

It is also my belief that these tannin-protein complexes are readily susceptible to oxidation processes which take place slowly at ordinary temperatures and more rapidly at high, e. g., pasteurizing temperatures, and that the resulting oxidation compounds are unstable and settle out, forming permanently insoluble turbidities.

I have also found that beer has a tendency to cloudiness, turbidity and discoloration under the influence of agitation and the presence of traces of heavy metals, such as iron or tin, which are inadvertently introduced from pipe lines, filters, etc. Beer, in fact, is normally so sensitive to tin, that a deleterious effect is caused by a concentration as low as one part in one hundred million.

It is an object of the present invention to provide a method of producing beer, such that the beer has a relatively high degree of stability against cold, heat, agitation and the presence of metals, whereby the beer remains clear, brilliant and of a proper color.

I have discovered that beer is rendered more stable to the influences of heat, cold, agitation and the action of metals by the addition of tannase, i. e., an enzyme having the property of cleaving or hydrolyzing tannin. It is my belief that the addition of the tannase so acts on or modifies the tannin as to prevent or check the formation of the protein-tannin complexes above referred to.

In any event, I have demonstrated by tests and experiments that when tannase is added to beer, the treated beer is much less likely to become cloudy, turbid or discolored when severely agitated; when subjected to high temperatures; when subjected to low, even freezing, temperatures; when subjected to sudden changes of temperature; and when containing traces of heavy metals such as iron and tin.

While the tannase may be derived in any suitable manner, such enzymes may be readily derived from fungus mycelium by cultivation under suitable conditions, in accordance with known practice. For example, tannase may be formed by moulds of the type Aspergillus Niger cultivated on a tannin-containing medium such, for example, as a liquid extract of myrobalan to which various nutrient salts, such as ammonium sulphate, potassium diphosphate and magnesium sulphate are added. After one to three days of growth at about 30–33° C., the mycelium is skimmed off, washed with water, alcohol and ether and dried. The tannase principle may be supplied to the beer by adding this dried material. If it is desired to use a more purified form, an enzyme-containing material may be obtained by precipitating at low temperatures with acetone and ether, centrifuging and washing with acetone and ether.

To obtain the most favorable yield, the strain thus cultivated should contain an appreciable amount of tannase to begin with. The enzyme may be recognized by its action in splitting methyl gallate to gallic acid and methyl alcohol. The gallic acid thus formed may be titrated and compared with a blank, in accordance with known practice.

While the material containing the tannase principle may be added at any desired stage following addition of the yeast and prior to bottling, canning or racking, what are now considered the best results are obtained if the addition is made subsequent to main fermentation and prior to tank storage.

The amount of tannase to be used may vary and will depend somewhat on the strain developed. When the skimmed and dried form of material above referred to is used, I have found that, with a normally good strain, about 0.25 gram of such material per liter of beer is sufficient to give satisfactory results. If the more purified form of material is used, the amount of material added may be reduced in proportion to the increased concentration of enzymatic strength. I have found that the precipitation product above referred to has an enzymatic strength about ten times as great as the unpurified form and, hence, I use about one tenth as much of such material.

In addition to rendering the beer more stable, the use of tannase results in a general improvement in clarification and a lighter color in the wort.

I have also discovered that particularly advantageous results are obtained if both the enzyme tannase and a proteolytic enzyme, such as pepsin or papain, are added to the beer, in that a greater degree of stability is obtained than when either the protease or tannase preparation is used alone. If both kinds of enzyme are used, proteolytic enzymes may be added in accordance with the instructions of the aforementioned patents. The protease and tannase preparations may be added together or at different times.

What is claimed is:

1. In the art of producing fermented malt beverages, the improvement which consists in adding to the beverage, at any suitable stage of the production thereof after addition of the yeast and before packaging or racking, an enzyme having the property of cleaving tannin, such enzyme being of the type known as tannase.

2. The process of stabilizing fermented malt beverages against cloudiness and turbidity which comprises adding to the beverage an enzyme having the property of cleaving tannin, such enzyme being of the type known as tannase.

3. The process of stabilizing fermented malt beverages against cloudiness and turbidity which comprises adding to the beverage a material containing an enzyme having the property of cleaving tannin, such enzyme being of the type known as tannase.

4. In the art of producing fermented malt beverages, the improvement which consists in adding to the beverages, subsequent to main fermentation and prior to tank storage, an enzyme having the property of cleaving tannin, such enzyme being of the type known as tannase.

JAMES S. WALLERSTEIN.